Patented Aug. 25, 1953

2,650,215

UNITED STATES PATENT OFFICE 2,650,215

POLYMER AND METHOD OF PREPARING SAME

Franklin Strain, Barberton, Ohio, assignor, by mesne assignments, to Columbia-Southern Chemical Corporation, Pittsburgh, Pa., a corporation of Delaware No Drawing. Application January 13, 1951, Serial No. 205,961

11 Claims. (Cl. 260—77.5)

This invention relates to novel copolymers of maleimide and novel methods of polymerizing such copolymers.

It is known that various ethylenically unsaturated compounds which contain a negative group attached to an ethylenic group and which are free from conjugation with respect to carbon may be polymerized in the presence of peroxide type polymerization catalysts. For example, it is known that allyl or other unsaturated alcohol esters of various acids such as diallyl phthalate, diallyl carbonate, etc. can be polymerized in the presence of peroxide type catalysts to form polymers which are insoluble in organic solvents such as acetone and which in general are essentially infusible. Polymerizable materials of this character have been tested rather extensively for the production of clear cast resinous sheets and also of laminated fibrous resinous products. One of the chief difficulties with the polymerization of materials of this character lies in the fact that the polymerization is comparatively slow and requires a considerable period of time, often several hours. This, of course, is objectionable since it reduces production rates from the equipment used unduly.

However, a more serious objection is encountered due to the unduly slow gelation time of these polymerizable materials. For example, in the production of resinous laminated products, fibrous bodies or stacks of fibrous sheets are impregnated with the polymerizable liquid and are heated to the curing temperature. During curing the liquid polymerizable material, which usually has a comparatively low viscosity, tends to drain from the fabric thereby producing drain marks in the ultimate laminate and resulting in the production of an unsightly and relatively weak fibrous product. This problem is particularly acute in the production of shaped products having curved or non-planar surfaces. Since in such a case the impregnated fibrous product will at all times during curing have certain portions thereof lying in a plane other than horizontal and therefore drainage from such portions readily tends to occur.

Many of the ethylenic compounds, such as methyl methacrylate contain but a single unsaturated group. Such compounds polymerize to produce thermoplastic polymers. Frequently it is observed that such materials have unduly low heat distortion points. Such low heat distortion characteristic materially limits the field in which many of these plastic materials may be used.

In accordance with the present invention it has been found that the properties including time required for polymerization, gelation and other properties of resins obtained by polymerizing polymerizable ethylenically unsaturated compounds which contain a negative group attached to an ethylenic group and which are free from conjugation with respect to carbon may be substantially improved by copolymerizing the ethylenically unsaturated compond with a quantity of a maleimide.

A particular advantage gained by copolymerizing some of the ethylenic compounds disclosed below with a maleimide is that such copolymers forming clear cast resinous sheets have unusually good craze resistance and high heat distortion temperatures or heat resistance. This is especially true of copolymers of a maleimide with compounds which contain but a single polymerizable ethylenic group.

Maleimides which are contemplated in the practice of the invention have the general structure:

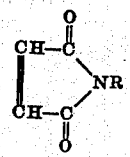

where R is hydrogen or an organic radical linked to the nitrogen through carbon. For example, the allyl, vinyl or other unsaturated alcohol esters herein contemplated may be copolymerized with maleimide or the alkyl, alkenyl, alknyl, aryl or other N-substituted maleimides such as N-ethyl, N-allyl, N-methallyl, N-2-chloroallyl, N-propargyl, N-isopropyl, N-vinyl, n-butyl and N-phenyl, N-benzyl, N-octyl, N-hexyl, N-cinnamyl maleimide or other N-substituted maleimide particularly those in which the substituent radical R linked to the nitrogen group contains up to about 10 carbon atoms, usually less than 6 carbon atoms in an aliphatic chain. Best results are often obtained when the radical R contains 2 to 3 carbon atoms.

When the allyl esters are copolymerized with maleimides such as those above listed the time required before the polymerizable mixture is converted to a solid gel is reduced from a matter of hours to a matter of minutes. For example, the time for gelation of diallyl phthalate containing 1 to 5% benzoyl peroxide when heated at 70° C. usually requires about 2 to 4 hours. In contrast mixtures containing substantial quantities of the above maleimides may be polymerized to a gel at the same temperature within a matter of a few minutes, for example 5 to 15 minutes or even shorter period of time. This shortened gelation time is of considerable value since it materially reduces the opportunity for drainage from laminated or other fibrous impregnated products or leakage from casting cells. Moreover, the polymers which are obtained generally have greater heat resistance and less peroxide is required to secure polymerization to a desired degree of cure.

The amount of maleimide required depends to a degree upon the comparative activity of the allyl or other unsaturated alcohol ester. Where the unsaturated ester is but weakly polymerizable more maleimide is required to stimulate the rate of polymerization than is required where the polymerizable ester is more active. In general, at least 5 to 10% by weight of the maleimide, based upon the weight of polymerizable unsaturated alcohol ester, is used and frequently 20% or more of maleimide is required for this purpose in order to secure an optimum gelation time. Larger quantities of maleimide may be used. However, it is rarely expedient to polymerize compositions in which the maleimide concentration exceeds 60 to 75% of the total polymerizable components. The advantageous effects achieved by use of maleimides may be clearly illustrated by the following example:

Example I

Quantities of diethylene glycol bis(allyl carbonate) were made up containing 20% by weight, based upon the weight of diethylene glycol bis-(allyl carbonate), of a number of maleimides. These compositions were mixed with weighed amounts of benzoyl peroxide and were heated at 70° C., the time for gelation being observed carefully. As a standard of comparison a quantity of diethylene glycol bis(allyl carbonate) containing 2% benzoyl peroxide was heated under the same conditions. The following table lists the materials copolymerized under these conditions with the carbonate ester, the concentration of benzoyl peroxide used, the temperature of heating and the time required for gelation.

| Added Compound | Concentration of Benzoyl Peroxide, Percent | Temp. of heating, °C. | Gelation Time |
|---|---|---|---|
| No addition | 2 | 70 | 3 hours. |
| Maleimide | 2 | 70 | 6 minutes. |
| N-ethyl maleimide | 2 | 70 | Less than 10 min. |
| N-phenyl maleimide | 2 | 70 | 15 minutes. |
| N-allyl maleimide | 1 | 70 | 12 minutes. |
| Do | 2 | 70 | 8 minutes. |
| N-butyl maleimide | 2 | 70 | 6 minutes. |

Similar results are secured when the corresponding methallyl ester in used in lieu of the allyl ester or when ethylene glycol bis(allyl carbonate) or ethylene bis(methallyl carbonate) is used.

The above described process has been found to be generally applicable to the polymerization of various polymerizable unsaturated alcohol esters of saturated polybasic acids. Thus, the invention may be applied to the copolymerization of diallyl carbonate, diallyl phthalate, diallyl succinate, diallyl adipate, diallyl azelate, diallyl oxalate, allyl silicate, allyl tartarate, etc.

Furthermore, the invention may be applied to the polymerization of allyl esters of more complex polybasic acids wherein the acid groups are separated by ester, ether or nitrogen linkages. Such esters include esters of (A) a polyhydric alcohol such as ethylene glycol, diethylene glycol, propylene glycol, glycerol, resorcinol, phthallyl alcohol, etc. and (B) allyl acid carbonate or an allyl acid ester of a saturated dicarboxylic acid such as phthalic, succinic acid, etc. wherein two or more of the hydroxy groups of the polyhydric alcohol are esterified with the acid. They also include carbamate esters such as may be prepared by reaction of allyl carbamate with an aldehyde such as formaldehyde or acetaldehyde, esters prepared by reaction of allyl chloroformate with allyl esters of hydroxy acids such as allyl lactate, allyl glycolate, allyl alpha hydroxy butyrate, allyl salicylate, etc. and other unsaturated alcohol polyesters such as are described in U. S. Patents Numbers 2,387,933, 2,385,932 and 2,401,549.

While the invention has been described with particular reference to allyl esters it is not so limited since it may be used to activate the polymerization and shorten the gelation time of the other esters of unsaturated alcohols which contain 3 or more carbon atoms. Such unsaturated alcohols preferably contain no more than 10 carbon atoms and an unsaturated carbon-carbon bond in the beta gamma position, usually containing a terminal group such as

and CH≡C—. For example, maleimides such as above listed may be copolymerized with the corresponding polybasic acid esters of 2-chloroallyl alcohol, crotyl alcohol, cinnamyl alcohol, methylvinylcarbinol, propargyl alcohol, 2-chloro-3-byvinylcarbinol, propargyl alcohol, 2-chloro-3-bytenol-1, butadienyl alcohol, β-methylethynylcarbinol, allylethynylcarbinol, or tiglyl alcohol and the gelatin time required for the polymerization materially shortened, with the consequent production of a product of superior resistance to softening and loss of strength when subjected to heating.

It is to be understood that the invention contemplates the presence of a non-ethylenic dicarboxylic acid component along with the ethylenically unsaturated dicarboxylic acid in the polyester. Up to 10 to 12 mols of the non-ethylenic dicarboxylic acid per mol of the ethylenically unsaturated dicarboxylic acid may be used. These non-ethylenic acids include phthalic acid, tetrachlorophthalic acid, succinic acid, adipic acid, suberic acid, azelaic acid, sebacic acid, dimethyl succinic acid, their halogenated derivatives and mixtures thereof. For purposes of the present invention, the aromatic nuclei of such acids as phthalic are regarded as saturated since the double bonds do not react by addition as do ethylenic groups.

The following additional examples are further illustrative of the invention:

Example II

Twenty (20) parts by weight of N-ethyl maleimide and eighty (80) parts by weight of diethylene glycol bis(allyl carbonate) were copolymerized in the presence of 2 parts by weight of benzoyl peroxide. The mixture was heated for 24 hours at 45° C., 2 hours at 60° C., 24 hours at 70° C. and 3 hours at 100° C. The copolymer was colorless, had a Barcol hardness of 14, and an ASTM heat distortion point of 88° C.

The polymer of unmodified diethylene glycol bis(allyl carbonate) prepared in a similar manner using 3 percent of benzoyl peroxide as catalyst possessed a Barcol hardness of 29 and a heat distortion point of 70° C.

Example III

Seventy parts by weight of N-ethyl maleimide and 30 parts by weight of diethylene glycol bis-(allyl carbonate) were copolymerized in the presence of 0.5 part by weight of benzoyl peroxide. The mixture was cured at 40° C. for 16 hours, 40–60° C. for 6 hours, 70° C. for 17 hours, 80–100° C. for 4 hours and 100° C. for 3 hours. The copolymer had a Barcol hardness of 37 and an ASTM heat distortion point of 123° C.

This copolymer could be formed to a greater extent above its heat distortion point before rupture, than could the copolymer of Example II above the heat distortion point of the latter.

Example IV

A polyester was prepared by heating together two mols of propylene glycol, one mol of phthalic anhydride and one mol of maleic anhydride to a temperature which gradually rose to about 200° C. over a period of several hours. Seventy-five grams of styrene, 0.02 gram of trimethyl benzyl ammonium chloride, and 25 grams of N-ethyl maleimide were added to the resulting product and the mixture was allowed to cool.

Thereupon, 0.5 percent by weight of tertiary butyl hydroperoxide was added and the mixture was heated to a temperature of about 93° C. for approximately one hour causing the mixture to polymerize to the setting stage. The mixture was rendered harder and more durable by baking at a temperature of about 125 to 200° C. for several hours.

Although the present invention has been described with particular reference to the specific details of certain embodiments thereof it is not intended that such details shall be regarded as limitations upon the scope of the invention except insofar as included in the accompanying claims.

This application is a continuation-in-part of my copending application, Serial No. 699,642, filed September 27, 1946.

I claim:

1. A copolymer of (a) a polymerizable ester of a polybasic acid which is free from aliphatic unsaturation and an unsaturated monohydric alcohol which contains 3 to 10 carbon atoms and an aliphatic polymerizable unsaturated carbon to carbon linkage between the beta and gamma carbon atoms and (b) a maleimide which has the general structure

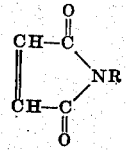

where R is hydrogen or an organic radical linked to the nitrogen through carbon; the concentration of the maleimide being not less than 5 percent of the weight of the ester and up to 75 percent of the total polymerizable components.

2. A copolymer of (a) a polymerizable ester of a polybasic acid which is free from aliphatic unsaturation, and an unsaturated monohydric alcohol which contains 3 to 10 carbon atoms and an aliphatic polymerizable unsaturated carbon to carbon linkage between the beta and gamma carbon atoms; and (b) a maleimide, the concentration of the maleimide being not less than 5 percent of the weight of the ester and up to 75 percent of the total polymerizable components.

3. A copolymer of (a) a polymerizable ester of a polybasic acid which is free from aliphatic unsaturation and allyl alcohol and (b) a maleimide which has the general structure

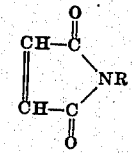

where R is a member of the group consisting of hydrogen and organic radicals linked to nitrogen through carbon; the concentration of the maleimide being not less than 5% of the weight of the ester and up to 75% of the total polymerizable components.

4. The copolymer of claim 1 wherein the polymerizable ester is diethylene glycol bis(allyl) carbonate.

5. The copolymer of claim 1 wherein the polymerizable ester is allyl phthalate.

6. A method of polymerizing a polymerizable composition comprising a polymerizable ester of a polybasic acid which is free from aliphatic unsaturation and an unsaturated monohydric alcohol which has 3 to 10 carbon atoms and an aliphatic polymerizable unsaturated carbon to carbon linkage between the beta and gamma carbon atoms, which comprises polymerizing the ester in the presence of a maleimide which has the general structure

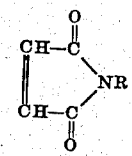

where R is a member of the group consisting of hydrogen and organic radicals linked to nitrogen through carbon, in amount not less than 5 percent by weight of the ester and up to 75 percent of the total polymerizable components of the composition.

7. A method of polymerizing a polymerizable composition comprising an ester of a polybasic acid which is free from aliphatic unsaturation, and an unsaturated monohydric alcohol which contains 3 to 10 carbon atoms and an aliphatic polymerizable unsaturated carbon to carbon linkage between the beta and gamma carbon atoms, which comprises polymerizing the ester in the presence of a maleimide, in amount not less than 5 percent by weight of the ester and up to 75 percent of the total polymerizable components of the composition.

8. A method of polymerizing a polymerizable composition comprising an ester of allyl alcohol and polybasic acid which is free from aliphatic unsaturation, which ester contains two allyl groups which comprises polymerizing the ester in the presence of a maleimide which has the general structure

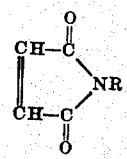

where R is a member of the group consisting of hydrogen and organic radicals linked to nitrogen through carbon in amount not less than 5% by weight of the ester and up to 75% of the total polymerizable components of the composition.

9. The process of claim 8, wherein the unsaturated alcohol ester is diethylene glycol bis(allyl carbonate).

10. The process of claim 8, wherein the polymerizable ester is allyl phthalate.

11. The copolymer of claim 7, wherein the alcohol is allyl alcohol.

FRANKLIN STRAIN.

References Cited in the file of this patent

UNITED STATES PATENTS

| Number | Name | Date |
|---|---|---|
| 2,313,565 | McDowell | Mar. 9, 1943 |
| 2,370,943 | Dietrich | Mar. 6, 1945 |
| 2,462,354 | Brubaker et al. | Feb. 22, 1949 |
| 2,472,672 | Mighton | June 7, 1949 |
| 2,475,424 | Dickey et al. | July 5, 1949 |